Nov. 22, 1960  J. P. NOCKELS  2,961,262
LATCH MECHANISM
Filed May 25, 1959

INVENTOR
John P. Nockels

BY Rommel, Allware Rommel
ATTORNEYS

United States Patent Office 2,961,262
Patented Nov. 22, 1960

2,961,262

LATCH MECHANISM

John P. Nockels, P.O. Box 42, Rte. 2, Sedalia, Colo.

Filed May 25, 1959, Ser. No. 815,726

5 Claims. (Cl. 292—113)

This invention relates to improvements in tail gate latches.

The primary object of this invention is the provision of an improved latch mechanism adapted for end or tail gates which is relatively simple in operation, and which can be manipulated by a single hand of an operator to latch the tail gate upon the body of a vehicle secured against any possibility of accidental opening such as by jolting or jarring of the vehicle while in motion.

The usual means of securing tail or end gates upon vehicles comprise such expedients as chains, drop pins, bars, etc. Usually they require both hands of an operator in order to manipulate and adjust the parts either for opening or closing the end gate and usually they do not provide a tight and rigid closed connection of the end gate upon the vehicle. It is therefore a purpose of this invention to provide a relatively simple type of latch mechanism upon each side of a vehicle which can with facility be manipulated by an operator in order to engage the keepers of an end gate for holding the latter in secured and firm position.

Other objects and advantages of this invention will be apparent during the course of the following detailed description.

In the accompany drawing, forming a part of this specification, and wherein similar reference characters designate corresponding parts throughout the several views.

Figure 1:
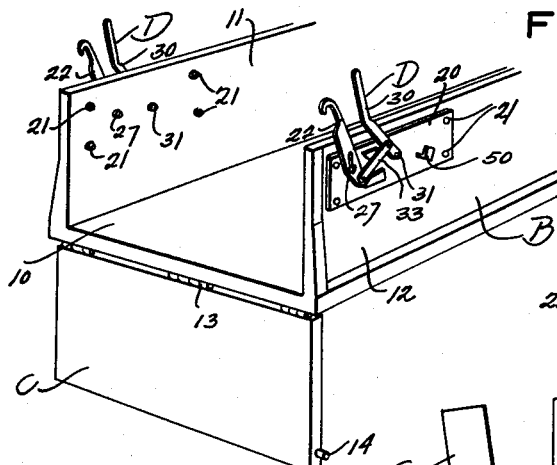
Figure 1 is a fragmentary perspective view of a vehicle body having an end gate and showing the improved latching mechanism associated therewith; the end gate being shown fully opened and the latch mechanisms in released positions.

In the drawing, wherein for the purpose of illustration is shown only a preferred embodiment of the invention, the letter A may generally designate a vehicle which includes a vehicle body B having an end gate C, and having associated therewith at each side of the vehicle, latch mechanisms D, constituting this invention.

The body of the vehicle B includes the deck 10 having the side upright walls 11 and 12, and at the rear thereof having an opening which is adapted to be closed by the tail gate C which is hingedly connected at 13 to the rear of the deck. At each side thereof, the tail gate C is preferably provided with a securely attached keeper 14, which is in the form of a stud or laterally projecting fin member adapted to be engaged by the latch bolt of the mechanism D, as will be subsequently described.

A latch mechanism D is adapted to be placed upon the outer side of each side wall 12. Preferably the latch mechanisms D comprise in itself a unitary assemblage which may be easily attached to the walls 11 and 12 and all of the parts thereof are preferably of metal.

Figures 5, 6:
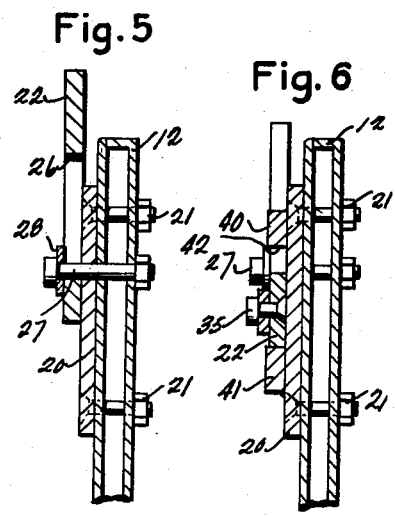
Figure 5 is a fragmentary vertical cross sectional view taken through certain details of the latch mechanism substantially on the line 5—5 of Figure 2.
Figure 6 is a fragmentary vertical cross sectional view taken substantially on the line 6—6 shown in Figure 3, through certain other details of the latch mechanism.

The mechanism D includes a foundation or base plate 20 which is preferably bolted at 21 to the outer surfaces of the side walls 11 and 12. A latch bolt 22 of elongated formation is provided, having a hooked end 25 adapted to engage with a keeper stud 14. Intermediate its ends the latch bolt 22 is provided with a diagonally disposed slot 26 which extends in line at an acute angle to the longitudinal axis of the latch bolt 22, and which is adapted to slidably receive a pivot bolt or pin 27, well shown in Figure 5 of the drawings, which is attached through the base plate 20 and side wall of the vehicle. The ends of the pivot pin 27 are headed and a washer 28 may be employed to hold the pivot pin 27 against movement out of the slot 26.

An operating handle 30 is provided for each latch mechanism D, rearwardly spaced from the latch bolt 22, and pivoted on a fixed axis by a pivot pin 31 which is secured through the base plate 20 and the vehicle side wall. A connecting link 33 is pivoted at 34, at its rear end, to the operating lever 30 spaced from but close to the pivot pin 31 and the opposite end of the link 33 is pivoted at 35 at the extreme inner end of the latch bolt 22, spaced from the pivot pin 27.

Figure 2:
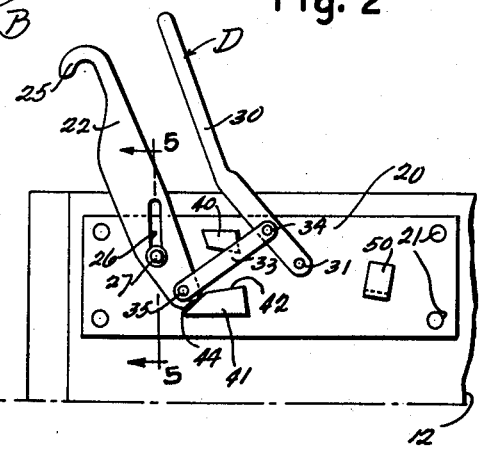
Figure 2 is a fragmentary view of a vehicle body and end gate with the latter in position about closed, and showing the improved latch in partially opened position.

It will be apparent from Figure 2 of the drawings that when the latch bolt is in the position shown in Figure 2, it will be free of interference with opening and closing of the end gate. In the position shown in Figure 4, the axis of the handle pivot 31 will lie above and between a straight line intersecting the axes of the pivots 34 and 35 of the link 33, and the latch bolt 22 itself will engage the the keeper stud 14 and hold the end gate closed against possibility of opening due to the position of the pivot 31 being positioned beyond the dead center connections of the link 33 with the handle 30 and the latch bolt 22.

In order to cam the movement of the latch bolt 22 and insure that it latches the keeper 14, I prefer to provide guiding means in the nature of cam plates or lugs 40 and 41, which may be welded on the outer surface of the base plate 20 and which define a guide way 42 wherein the lower rear convexed end of the latch bolt 22 may move and snugly seat therebetween as the handle 30 is swung to the rear for latching the bolt upon the keeper stud 14. To that end, the lug 41 has a sloping cam face 44 and the facing edges of the guide lugs 40 and 41 defining the way 42 are rearwardly divergent. The edges of the latch bolt 22 at the rear are similarly shaped.

Figure 3:
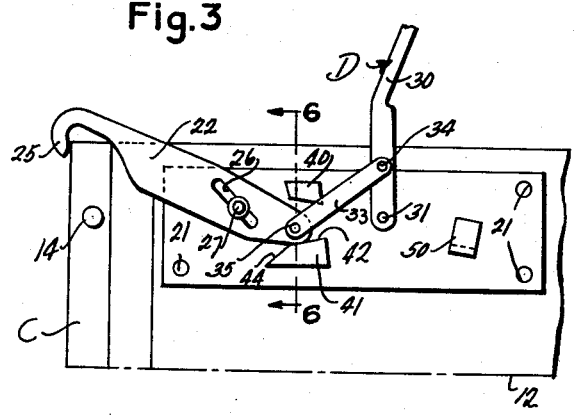
Figure 3 is a fragmentary side elevation of the parts shown in Figure 2, but showing the end gate closed against the vehicle, and the latch mechanism being moved forwardly to a latching and locking position.
Figure 4:
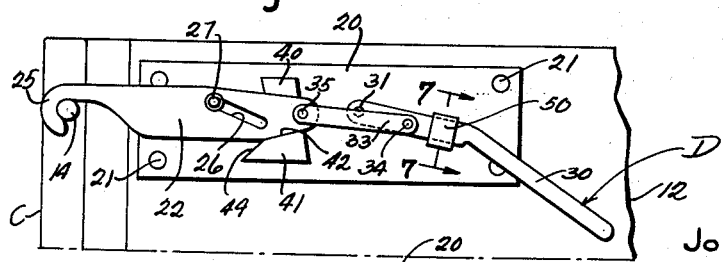
Figure 4 is a view of the details shown in Figure 3, but with the latch mechanism in keeper engaging position to hold the end gate against the vehicle body in a firm and secured position.
Figure 7:
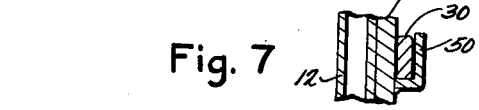
Figure 7 is a fragmentary cross sectional view taken substantially on the line 7—7 of Figure 4, showing a handle securing bracket.

Assuming the latch mechanism D to be in the opened position as shown in Figure 2, the end gate is closed to the position shown in Figure 3, and the operator moves handle 30 forwardly. Through the linkage 33, this movement pulls the rear lower end of the latch bolt 22 against the cam edge 44 and moves it into position in the way 42. During this movement, the latch bolt 22 will, by means of slot 26, slide along the pivot pin 27. Referring to Figure 3, the keeper bolt is now approaching the keeper stud 14. The operator, by forward movement of the handle 30 so that it engages in the U-shaped bracket 50, which may be welded on to the base or fundation plate 20, has now swung the link 33 to position pivot pin 31 past the dead center line intersecting the pivots 34 and 35 of the link 33, and this has moved the latch bolt downwardly at its rear end for engaging the keeper stud 14, and at which time the pivot pin 27 rests in the extreme upper and rear end of the slot 26, as shown in Figure 4.

In order to release the latch mechanism D it is merely necessary to reverse the action of the handle 30.

Various changes in the shape, size, and arrangement of parts may be made to the form of invention herein shown and described, without departing from the spirit of the invention or scope of the claims.

I claim:

1. In a tail gate latch mechanism, the combination of a base plate, a latch bolt pivotally and slidably mounted upon the base plate, a handle mechanism pivoted on the base plate spaced from the pivot of the latch bolt, a rigid link pivotally connected at one end to an end of the latch bolt spaced at the opposite side of the latch bolt pivot from the latching end and pivotally connected to the handle spaced from the pivot of the handle in the direction of the hand engaging portion of the handle.

2. A latching mechanism as defined in claim 1 in which guide means is fixedly mounted on the plate for camming the link connected end of the latch bolt and for guiding the movement of the latch bolt as it is moved into latching position by the handle mechanism.

3. A latching mechanism as described in claim 1 in which the pivot of the latch bolt comprises a pin and the latch bolt is provided with a slot along which said pin moves as the latch bolt is swung into latching and unlatching positions, said slot being inclined at an acute angle to the lengthwise axis of the latch bolt.

4. In a latch mechanism for holding closures in shut position upon containers, the combination of a supporting base, a latch bolt pivotally and slidably mounted upon the base plate, a handle mechanism pivoted on the base plate on a pivot axis spaced from the pivot axis of the latch bolt, a rigid link pivotally connected at one end to the latch bolt spaced at the opposite side of the latch bolt pivot from the latching end of the bolt and also pivotally connected at its other end to the handle spaced from the pivot of the handle in the direction of the hand engaging portion of the handle, said pivot connections of the link being so associated with respect to the pivot mounting of the latch bolt that when in closure latching position the pivot axis of the latch bolt will lie beyond dead center of a straight line drawn through the pivot axes of the rigid link where the same is pivoted to the latch bolt and the handle.

5. In a latch mechanism for holding closures in shut position upon containers, the combination of a supporting base plate, an elongated latch bolt pivotally and slidably mounted upon the base plate, the base plate having a fixed pivot thereon and the bolt having a slot therein diagonally disposed with respect to the longitudinal axis of the bolt in which the fixed pivot is disposed for said slidable and pivotal mounting of said bolt upon the plate, a handle mechanism having a fixed pivot mounting upon said plate, an elongated rigid link pivotally connected to said handle at a location spaced from the handle pivot and also pivotally connected to the bolt at the end thereof opposite the latching end of the bolt, and at the opposite side of the latching end with respect to said diagonal slot, and cams mounted on said plate defining a way which gradually narrows from the entrance end of the way in the direction of the pivot mounting of the handle and in which way the link connected end of the bolt lies whereby as the handle is pivoted for bringing the bolt into latching position the link connected end of the bolt will enter said way for camming it into latching position, the pivot connections of the link being so associated and arranged with respect to the pivot mounting of the latch bolt that when in closure latching position the pivot axis of the latch bolt will lie beyond dead center of a straight line drawn through the pivot axes of the rigid link where the link is pivoted to the latch bolt and the handle.

References Cited in the file of this patent

UNITED STATES PATENTS

| | | |
|---|---|---|
| 1,376,733 | Sanderson | May 3, 1921 |
| 1,446,083 | Avery | Feb. 20, 1923 |
| 1,573,866 | Rogers | Feb. 23, 1926 |
| 2,534,396 | Barnes | Dec. 19, 1950 |
| 2,538,385 | Schurman | Jan. 16, 1951 |

FOREIGN PATENTS

| | | |
|---|---|---|
| 491,723 | Great Britain | Sept. 5, 1938 |

UNITED STATES PATENT OFFICE
CERTIFICATE OF CORRECTION

November 22, 1960

Patent No. 2,961,262

John P. Nockels

It is hereby certified that error appears in the printed specification of the above numbered patent requiring correction and that the said Letters Patent should read as corrected below.

Column 2, line 9, for "fin" read -- pin --; line 63, strike out "the", last occurrence.

Signed and sealed this 25th day of April 1961.

(SEAL)

Attest:

ERNEST W. SWIDER
Attesting Officer

DAVID L. LADD
Commissioner of Patents